(12) United States Patent
Masuda et al.

(10) Patent No.: US 8,928,225 B2
(45) Date of Patent: Jan. 6, 2015

(54) LIGHT DISPLAY DEVICE FOR DISPLAYING A DISPLAY LEVEL

(75) Inventors: Hiroshi Masuda, Susono (JP);
 Yoshiyuki Furuya, Susono (JP);
 Hideaki Kageyama, Susono (JP)

(73) Assignee: Yazaki Corporation, Tokyo (JP)

( * ) Notice: Subject to any disclaimer, the term of this patent is extended or adjusted under 35 U.S.C. 154(b) by 72 days.

(21) Appl. No.: 13/379,708

(22) PCT Filed: Jul. 23, 2010

(86) PCT No.: PCT/JP2010/062463
§ 371 (c)(1),
(2), (4) Date: Dec. 21, 2011

(87) PCT Pub. No.: WO2011/010734
PCT Pub. Date: Jan. 27, 2011

(65) Prior Publication Data
US 2012/0139429 A1 Jun. 7, 2012

(30) Foreign Application Priority Data

Jul. 23, 2009 (JP) .................................. 2009-171872

(51) Int. Cl.
| | |
|---|---|
| *B60Q 1/14* | (2006.01) |
| *G09G 3/14* | (2006.01) |
| *B60K 35/00* | (2006.01) |
| *G01D 7/00* | (2006.01) |
| *G09F 9/33* | (2006.01) |

(52) U.S. Cl.
CPC ........ *G09G 3/14* (2013.01); *B60K 35/00* (2013.01); *G01D 7/00* (2013.01); *G09F 9/33* (2013.01); *B60K 2350/203* (2013.01); *G09G 2320/0247* (2013.01)
USPC ............. 315/77; 340/461; 340/462; 340/428; 340/441; 340/458

(58) Field of Classification Search
CPC ................. B60K 2350/2008; B60K 2350/203; B60Q 3/046; G09G 3/3406
USPC ............. 315/76, 77, 79, 80; 345/39, 46, 208, 345/690, 35, 33, 440.2, 77; 340/461, 462, 340/428, 438, 439, 441, 458, 815.65, 340/815.66, 525; 362/23, 61, 489
See application file for complete search history.

(56) References Cited

U.S. PATENT DOCUMENTS 4,348,666 A * 9/1982 Ogita ............................... 345/39
5,815,072 A * 9/1998 Yamanaka et al. ............ 340/461
(Continued)

FOREIGN PATENT DOCUMENTS

| EP | 1710771 A1 | 10/2006 |
|---|---|---|
| JP | 57-148186 U | 9/1982 |

(Continued)

OTHER PUBLICATIONS

International Search Report [PCT/ISA/210] issued by the International Searching Authority in corresponding International Application No. PCT/JP2010/062463 on Oct. 26, 2010.

(Continued)

*Primary Examiner* — Douglas W Owens
*Assistant Examiner* — Borna Alaeddini
(74) *Attorney, Agent, or Firm* — Sughrue Mion, PLLC

(57) ABSTRACT

Provided is a display device in which design properties have been improved by eliminating the flickering when the display level changes. A microcomputer (5) causes light emission of first LEDs (23 and 24) which are the first and second ones counting from the right end among the emitting first LEDs (21 to 24), with decreasing brightness towards the right end. Furthermore, the microcomputer (5) causes light emission of second LEDs from a second LED (77) which is disposed at the right end of the second LEDs (71 to 77), to a second LED (73) which is disposed at a position overlapped with the first LEDs (23 and 24) that emit light with decreasing brightness towards the right end, and also causes light emission of second LEDs (73 and 74), which are the first and second ones counting from the left end among the emitting second LEDs (73 to 77), with decreasing brightness towards the left end.

4 Claims, 6 Drawing Sheets

(56) References Cited

U.S. PATENT DOCUMENTS

| | | | |
|---|---|---|---|
| 7,487,672 B2 | 2/2009 | Tatsuno | |
| 7,501,939 B1* | 3/2009 | Belikov et al. | 340/438 |
| 7,901,107 B2* | 3/2011 | Van De Ven et al. | 362/231 |
| 8,553,052 B2* | 10/2013 | Wohrle et al. | 345/690 |
| 2006/0225495 A1 | 10/2006 | Tatsuno | |

FOREIGN PATENT DOCUMENTS

| | | |
|---|---|---|
| JP | 59-55784 U | 4/1984 |
| JP | 59-157617 A | 9/1984 |
| JP | 60-093193 A | 5/1985 |
| JP | 61147110 A | 7/1986 |
| JP | 63-186294 A | 8/1988 |
| JP | 10-26541 A | 1/1998 |
| JP | 2008-275973 A | 11/2008 |

OTHER PUBLICATIONS

Written Opinion [PCT/ISA/237] of the International Searching Authority in corresponding International Application No. PCT/JP2010/062463 on Oct. 26, 2010.

Extended European Search Report, dated Jan. 8, 2013, issued by the European Patent Office in counterpart European Patent Application No. 10802354.0.

Communication dated Dec. 4, 2013, issued by the State Intellectual Property Office of the People's Republic of China in corresponding Application No. 201080033776.3.

Office Action dated Jul. 3, 2014, issued by The State Intellectual Property Office Of The People's Republic Of China in counterpart Chinese Application No. 201080033776.3.

Notification of Reasons for Refusal, dated Jan. 7, 2014, issued by the Japanese Patent Office in counterpart Japanese Application No. 2009-171872.

* cited by examiner

1: DISPLAY DEVICE
2: FIRST LED GROUP
3: DIFFUSION PLATE
7 SECOND LED GROUP
8 THIRD LED
21 TO 27: FIRST LEDS
71 TO 77: SECOND LEDS (A)

(B)

(A)

(B)

LIGHT DISPLAY DEVICE FOR DISPLAYING A DISPLAY LEVEL

CROSS-REFERENCE TO RELATED APPLICATIONS

This application is based on Japanese patent application (No. 2009-171872) filed on Jul. 23, 2009, the contents of which are incorporated herein by reference.

TECHNICAL FIELD

The present invention relates to a display device, and more particularly, to a display device including a group of first light emitting elements which includes a plurality of first light emitting elements arranged in a line, and a light emission controlling unit, which displays a display level by making light emitting elements to emit light that ranges from one end of the first light emitting elements in the arrangement direction of the group of first light emitting elements to the first light emitting element at a position corresponding to a display level to be indicated.

BACKGROUND ART

As a display device for displaying the above described display level, it is known that, for example, a liquid crystal indicator is used to display a bar graph. The liquid crystal indicator is capable of displaying the bar graph with good appearance, but the cost is high. Therefore, as shown in FIG. 10, a display device is provided that uses a plurality of LEDs to display a bar graph (for example, Patent Literatures 1 and 2).

As shown by (B) in FIG. 10, the display device 1 includes a first LED group 2 (a group of first light emitting elements), a display panel 10 and a casing 4. The first LED group 2 includes a plurality of LEDs 21 to 25 (the first light emitting elements) arranged in a line on a substrate 6. Light emission of the LEDs 21 to 25 is controlled by a microcomputer not shown in the figure. The display panel 10 is arranged at the front side of the plurality of LEDs 21 to 25, and a plurality of segmented bars 11 to 15 (referring to (A) in FIG. 10) having light transmission property are arranged on the display panel 10 opposite to the respective LEDs 21 to 25. The casing 4 is arranged between the display panel 10 and the LEDs 21 to 25, and shaped into a quadrangle barrel which has openings to its front and rear sides.

Next, the behavior of the display device 1 with the above described structure will be explained below. For example, when a display level "3" is to be displayed, the microcomputer 5 makes some LEDs in the first LED group 2, that are from the LED 21 at the left end in the arrangement direction of the first LED group 2 to the LED 23 at a position corresponding to the display level "3" (the third one from the left) to emit light, as shown by (B) in FIG. 10. The light from these LEDs 21 to 23 passes through the corresponding segmented bars 11 to 13 and is emitted to the front side. In this way, as shown by (A) in FIG. 10, the segmented bars 11 to 13 from the leftmost one to the third one are lighted on and thus can be visually recognized, therefore enabling to indicate the display level.

However, the above described LED display device has a problem of lacking design properties as compared with a liquid crystal indicator. In addition, when the display level to be displayed changes in a short time from "2" to "3", from "3" to "2" or the like, as shown in FIG. 11, the segmented bar 13 corresponding to the display level "3" is turned on, and immediately turned off again, thus resulting in a problem of flickering.

CITATION LIST

Patent Literature

Patent Literature 1: JP-60-93193A
Patent Literature 2: JP-63-186294A

SUMMARY OF THE INVENTION

Technical Problem

Therefore, it is an object of the invention to provide a display device that improves design properties by eliminating the flickering when the display level changes.

Solution to Problem

A first aspect achieved to solve the above problems provides a display device, including: a group of first light emitting elements which includes a plurality of first light emitting elements arranged in a line; and a light emission control unit which is configured to display a display level to be indicated by causing light emission of first light emitting elements, the number of which corresponds to the display level, that starts with a first light emitting element arranged at one end in an arrangement direction among the plurality of first light emitting elements, wherein the display device further includes a diffusion plate which is arranged at a front side of the group of first light emitting elements, and the light emission control unit is configured to cause light emission of a predetermined number of first light emitting elements starting from the other end in the arrangement direction among the first light emitting elements that emit light, with decreasing brightness towards the other end in the arrangement direction.

In a second aspect, the display device further includes a group of second light emitting elements which includes a plurality of second light emitting elements arranged in parallel with the group of first light emitting elements and emits light of a color that is different from that of the first light emitting elements, wherein the light emission control unit is configured to cause light emission of second light emitting elements that ranges from a second light emitting element arranged at the other end in an arrangement direction of the plurality of second light emitting elements to a second light emitting element arranged at a position overlapped with the first light emitting elements that emit light with decreasing brightness towards the other end, and also to cause light emission of a predetermined number of second light emitting elements starting from one end in the arrangement direction among the emitting second light emitting elements, with decreasing brightness towards the one end in the arrangement direction.

In a third aspect, the display device further includes a third light emitting element which is arranged at a position corresponding to a specified display level and next to the group of first light emitting elements and the group of second light emitting elements, and emits light of a color that is different from those of the first light emitting elements and the second light emitting elements, wherein the light emission control unit is configured to cause light emission of the third light emitting element when the display level to be indicated becomes the specified display level.

In a fourth aspect, the display device further includes a third light emitting element which is arranged at a position corresponding to a specified display level and next to the group of first light emitting elements and the group of second light emitting elements, and emits light of a color that is different from those of the first light emitting elements and the second light emitting elements, wherein the light emitting control unit is configured to cause light emission of the third light emitting element with increasing brightness as the display level to be indicated becomes closer to the specified display level.

Advantageous Effects of the Invention

According to the first aspect of the invention as described above, the light from the first light emitting elements passes through the diffusion plate. Therefore, the diffusion plate emits light in the areas corresponding to the number of the first emitting elements, that is, a display level. Then, since a predetermined number of first light emitting elements from the other end in the arrangement direction among the emitting first light emitting elements are made to emit light with decreasing brightness towards the other end, the portion of the diffusion plate emits light with gradually decreasing brightness towards the other end. Therefore, the appearance becomes better and the flickering when the display level changes is eliminated, thus enabling improvement of the design properties of the display device.

According to the second aspect of the invention, the display level can be displayed in two mixed colors, thus enabling further improvement of the design properties of the display device.

According to the third and fourth aspects of the invention, it is possible to clearly indicate that the display level exceeds a specified display level.

MODES FOR CARRYING OUT THE INVENTION (First Embodiment)

Figure 1:
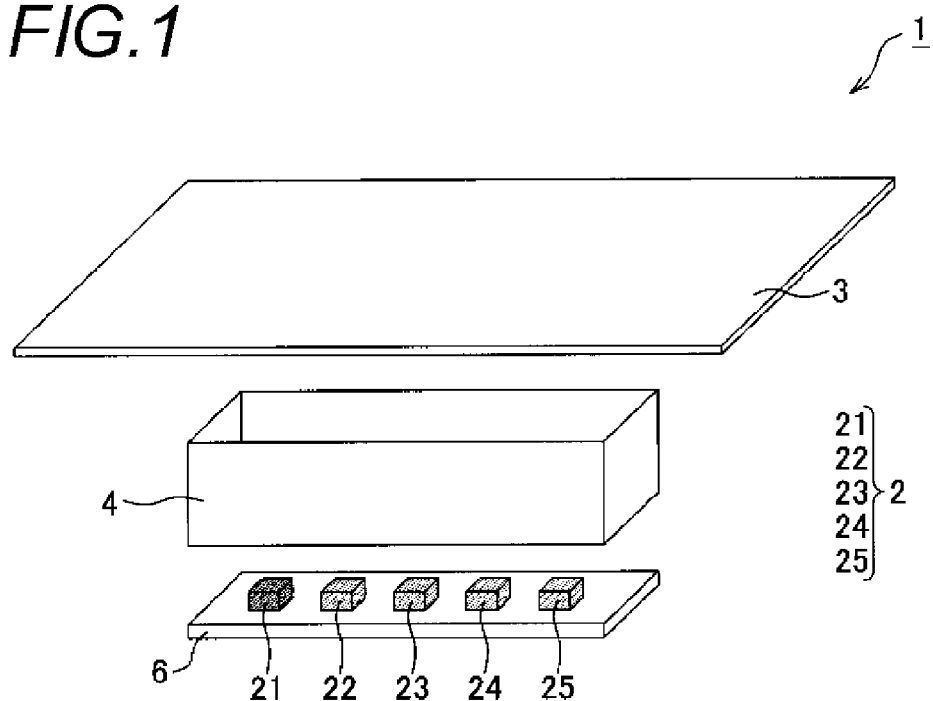
FIG. 1 is an exploded perspective view showing a display device of the invention in a first embodiment.
Figure 2:
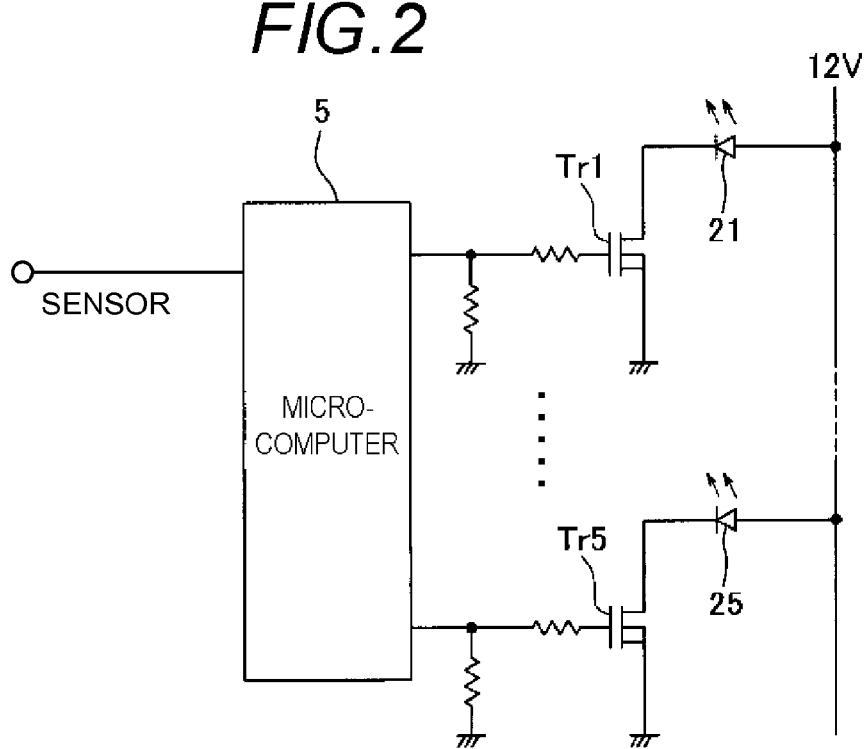
FIG. 2 is a circuit diagram showing an electrical configuration of the display device shown in FIG. 1.
Figure 3:
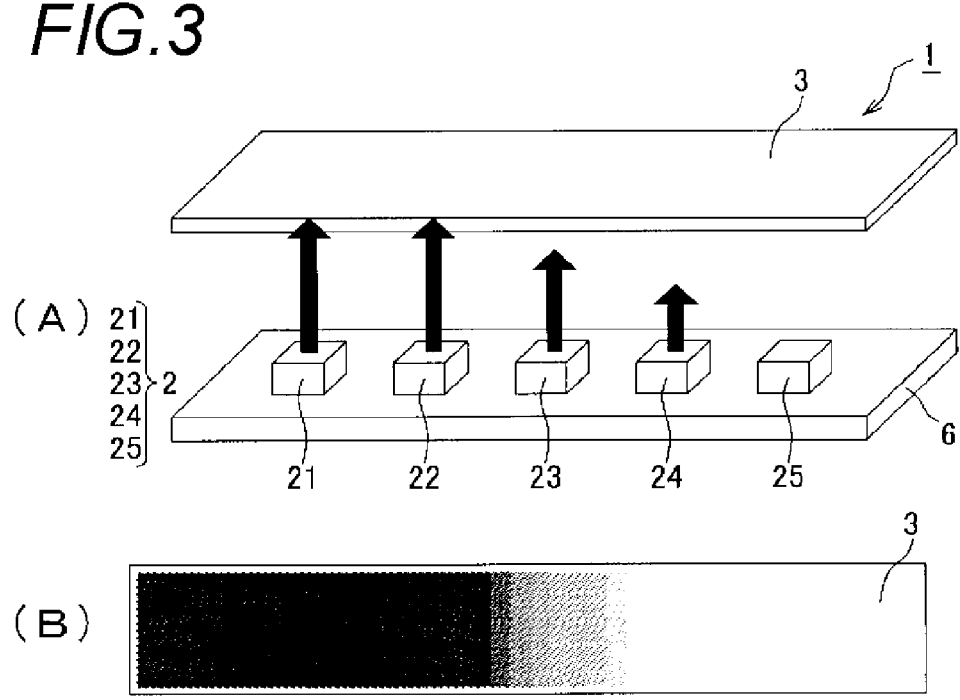
In FIG. 3, (A) is an exploded perspective view showing a display device of the invention in the first embodiment, and (B) is a front view of the display device shown in (A).

A first embodiment of the invention is explained below with reference to FIGS. 1 to 3. As shown in FIGS. 1 and 2, a display device 1 includes a first LED group 2 which is a group of first light emitting elements, a diffusion plate 3 (FIG. 1), a casing 4 (FIG. 1) and a microcomputer 5 (FIG. 2). The first LED group 2 includes first LEDs 21 to 25, which are a plurality of first light emitting elements arranged on a substrate 6 in a line. As shown in FIG. 2, each of the first LEDs 21 to 25 has two terminals. One terminal is connected to a 12V power supply, and the other is connected to a ground via one of transistors Tr1 to Tr5. When the transistors Tr1 to Tr5 are turned on, the first LEDs 21 to 25 are supplied with the 12V power supply. Then, the first LEDs 21 to 25 emit light of the same color (color A) as each other.

As shown in FIG. 1, the diffusion plate 3 is arranged at a front side of the first LED group 2 and is formed to be an elongated shape along the arrangement direction of the first LEDs 21 to 25. The diffusion plate 3 is made of, for example, a semi-transparent polycarbonate plate of milky white color, and has dispersed crystals inside by which light is diffused. The casing 4 is arranged between the first LED group 2 and the diffusion plate 3, and shaped into a quadrangle barrel which has openings to its front and rear sides. A whitening process, in which the light from the first LEDs 21 to 25 is reflected, is performed on the inner wall of the casing 4. Then, by performing the whitening process on the inner wall of the casing 4, the light from the first LEDs 21 to 25 can be effectively guided to the front side.

The microcomputer 5 includes a CPU, a ROM, a RAM and the like as known in the art to take the whole control of the display device 1. As shown in FIG. 2, the bases of the transistors Tr1 to Tr5 and a sensor not shown in the figure are connected to the microcomputer 5. Furthermore, by controlling the ON and OFF of the transistors Tr1 to Tr5, the microcomputer 5 causes light emission of LEDs, the number of which corresponds to the detection value of the sensors, among the first LEDs 21 to 25 that start from the first LED 21 located at the left end (one end) in the arrangement direction to display a detection value of the sensor (a display level to be indicated). In the embodiment shown in FIG. 3, the microcomputer 5 causes light emission of the first LEDs 21 to 24 and the first LED 25 to be turned off.

When the first LEDs 21 to 24 emit light, the light directly passes through the diffusion plate from the first LEDs 21 to 24 and the light passing through the diffusion plate 3 after reflected on the inner wall of the casing 4 are diffused inside the diffusion plate 3. As a result, as shown by (B) in FIG. 3, it can be seen in the diffusion plate 3 that light of color A is emitted from a position corresponding to the first LED 21 at the left end among the emitting first LEDs 21 to 24 to a position corresponding to the first LED 24 at the right end among the emitting first LEDs 21 to 24. That is, by emitting light in an emitting area corresponding to the detection value of the sensor, or the number of the emitting first LEDs 21 to 24, the diffusion plate 3 displays the detection value.

In addition, the microcomputer 5 causes light emission of the first LEDs 23 and 24 (which are, for example, two (a predetermined number) LEDs starting from the right end (the other end) among the emitting first LEDs 21 to 24), with decreasing brightness towards the right end. Particularly, the microcomputer 5 turns on the first LEDs 21 and 22 by switching on the transistors Tr1 and Tr2 all the time (100% duty cycle). The microcomputer 5 controls the ON and OFF state of the transistors Tr3 and Tr4 so that the duty cycle of the transistor Tr3 is larger than that of the transistor Tr4. Therefore, as shown by (A) in FIG. 3, the first LEDs 23 and 24 can be caused to emit light with decreasing brightness towards the right end. As a result, as shown by (B) in FIG. 3, the brightness of the light emitting portions of the diffusion plate 3 decreases gradually towards the right end.

According to the above described embodiment, the diffusion plate 3 is arranged at the front side of the first LED group 2, and the microcomputer 5 causes light emission of the two first LEDs 23 and 24, which are arranged at the right side among the emitting first LEDs 21 to 24, with decreasing brightness towards the right end. Therefore, the brightness of the light emitting portions of the diffusion plate decreases gradually towards the right end, and the appearance becomes better. In addition, since the flickering when the detection value of the sensor changes is eliminated, the design properties of the display device are improved.

(Second Embodiment)

Next, a second embodiment of the invention is explained with reference to FIG. 4. In the figure, parts that are the same as those of the display device 1 explained in the above described first embodiment of FIGS. 1 to 3 are given the same symbols, and their detailed description is omitted. A major difference between the first embodiment and the second embodiment is that besides the first LED group 2 that includes the first LEDs 21 to 27, the display device 1 further includes a second LED group 7 (a group of second light emitting elements). In the first embodiment, the first LED group 2 includes five first LEDs 21 to 25, while in the second embodiment, the first LED group 2 includes seven first LEDs 21 to 27. In addition, the second LED group 7 includes a plurality of second LEDs 71 to 77 arranged on the substrate 6 in a line and in parallel with the first LED group 2.

Similar to the first LEDs 21 to 27, each of the second LEDs 71 to 77 has two terminals. One terminal is connected to the 12V power supply, and the other is connected to a ground via respective transistor (not shown in the figure). When the transistors are turned on, the second LEDs 71 to 77 are supplied with the 12V power supply. Then, the second LEDs 71 to 77 emit light of the same color (color B) as each other. In addition, the second LEDs 71 to 77 are configured to emit light of a color that is different from the color of the first LEDs 21 to 27.

Similar to the first embodiment, the microcomputer 5 causes light emission of LEDs, the number of which corresponds to a detection value of the sensors, among the first LEDs 21 to 27 that starts from the first LED 21 located at the left end in the arrangement direction. In the embodiment shown in FIG. 4, the microcomputer 5 causes light emission of the first LEDs 21 to 24. In addition, the microcomputer 5 causes light emission of the first LEDs 23 and 24 (which are, for example, two LEDs starting from the right end among the emitting first LEDs 21 to 24) with decreasing brightness towards the right end.

Further, the microcomputer 5 causes light emission of second LEDs that range from the second LED 77, which is disposed at the right end of the plurality of second LEDs 71 to 77, to the second LED 73, which is disposed at a position that is overlapped with the first LEDs 23 and 24 that emit light with decreasing brightness towards the right end. Furthermore, the microcomputer 5 causes light emission of the second LEDs 73 and 74, which are two (a predetermined number) LEDs among the emitting second LEDs 73 to 77 that start from the left end in the arrangement direction, with decreasing brightness towards the left end. Similar to the first embodiment, the adjustment of the brightness can be implemented by controlling the ON/OFF duty cycle of the transistors corresponding to the second LEDs 73 and 74.

Figure 4:
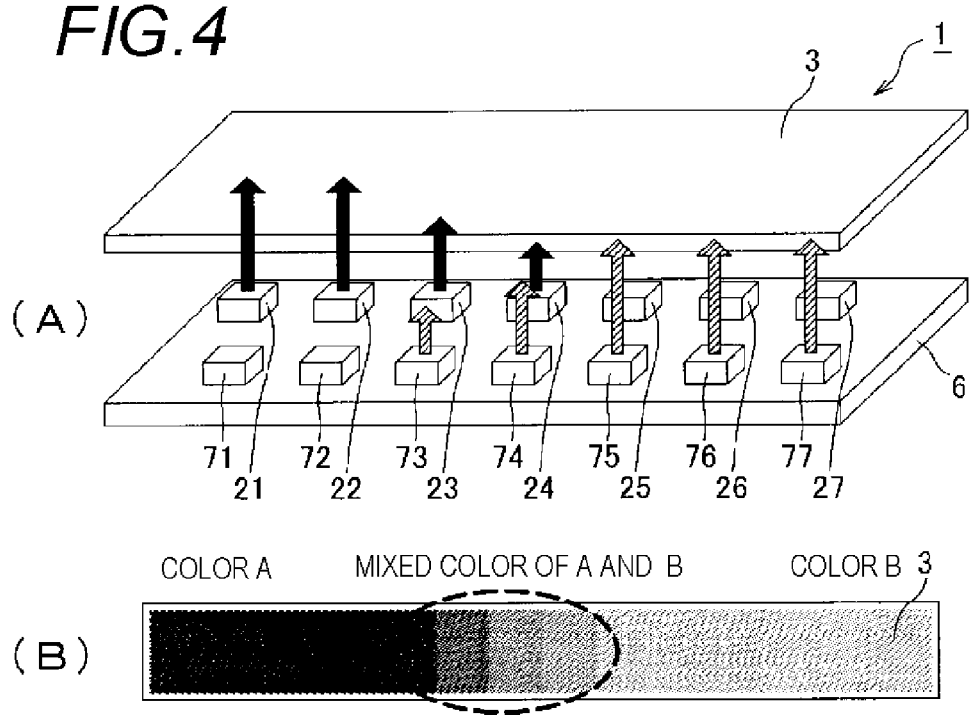
In FIG. 4, (A) is an exploded perspective view showing a display device of the invention in a second embodiment, and (B) is a front view of the display device shown in (A).

Therefore, as shown by (B) in FIG. 4, it can be seen in the diffusion plate 3 that light of color A is emitted in a portion that corresponds to the first LEDs 21 to 22, which are disposed at positions not overlapped with the emitting second LEDs 73 to 77 among the first LEDs 21 to 24. In addition, as surrounded by the dashed line of (B) in FIG. 4, it can be seen in the diffusion plate 3 that light of mixed color of A and B is emitted at positions corresponding to a portion where the emitting first LEDs 21 to 24 are overlapped with the emitting second LEDs 73 to 74.

Within the area surrounded by the dashed line where the light of mixed color is emitted, the intensity of color B increases gradually towards the right end, and the intensity of color A increases gradually towards the left end. It can be seen in the diffusion plate 3 that light of color B is emitted in a portion that corresponds to the second LEDs 76 to 77, which are disposed at positions not overlapped with the emitting first LEDs 21 to 24 among the emitting second LEDs 73 to 77. That is, the positions in the diffusion plate 3 where the light of mixed color is emitted vary with detection values of the sensors. In addition, similar to the first embodiment, since in the portion of the diffusion plate 3 where light of color A is emitted, the brightness of color A decreases gradually towards the right end, and in the portion where light of color B is emitted, the brightness of color B decreases gradually towards the left end, the appearance becomes better. In addition, since the flickering when the detection value of the sensor changes is eliminated, the design properties of the display device are improved. In addition, the detection value of the sensors can be displayed in two mixed color, thus enabling further improvement of the design properties.

(Third Embodiment)

Next, a third embodiment of the invention will be explained with reference to FIG. 5. In the figure, parts that are the same as those of the display device explained in the above described second embodiment in FIG. 4 are given the same symbols, and their detailed description will be omitted. A major difference between the second embodiment and the third embodiment is that the display device 1 includes a third LED 8. The third LED 8 is disposed at a position corresponding to a specified detection value (specified display level) and next to the first LED group 2 and the second LED group 7. In this embodiment, the third LED 8 is disposed in the center of the arrangement directions of the first LEDs 21 to 27 and the second LEDs 71 to 77.

Similar to the first LEDs 21 to 27 and the second LEDs 71 to 77, the third LED 8 has two terminals. One terminal is connected to the 12V power supply, and the other is connected to a ground via a transistor (not shown in the figure). When the transistor is turned on, the third LED 8 is supplied with the 12V power supply. Then, the third LED 8 emits light of color C. The third LED 8 is configured to emit light in a color (color C) that is different from those of the first LEDs 21 to 27 and the second LEDs 71 to 77.

Similar to the first and second embodiment, the microcomputer 5 causes light emission of LEDs, the number of which corresponds to a detection value of the sensor, among the first LEDs 21 to 27 that start from the first LED 21 located at the left end in the arrangement direction of the first LEDs 21 to 27. In the embodiment shown in FIG. 5, the microcomputer 5 causes light emission of the first LEDs 21 to 24. In addition, the microcomputer 5 causes light emission of the first LEDs 23 and 24, which are two LEDs starting from the right end among the emitting first LEDs 21 to 24, with decreasing brightness towards the right end.

In the second embodiment, the microcomputer 5 causes light emission of the second LEDs 73 to 77 when the first LEDs 21 to 24 emit light, while in the third embodiment, the microcomputer 5 causes light emission of the second LEDs 74 to 77 when the first LEDs 21 to 24 emit light. That is, in the second embodiment, the second LEDs 73 to 77 are caused to emit light so that two first LEDs from the right end of the emitting first LEDs 21 to 24 are overlapped with two second LEDs from the left end of the emitting second LEDs 73 to 77, while in the third embodiment, the second LEDs 74 to 77 are caused to emit light so that one first LED from the right end of the emitting first LEDs 21 to 24 are overlapped with one second LEDs from the left end of the emitting second LEDs 74 to 77.

In addition, the microcomputer 5 causes light emission of the third LED 8 when the detection value from the sensor becomes a specified detection value. In this case, the microcomputer 5 makes the transistor that is connected to the third LED 8 to be turned on all the time, so that the third LED 8 emits light with higher brightness than those of the first LEDs 23 and 24 and the second LEDs 74 and 75. Therefore, as shown by (B) in FIG. 5, it can be seen, in the diffusion plate 3, that light of color A is emitted in a portion that corresponds to the first LEDs 21 to 23, which are disposed at positions not overlapped with the emitting second LEDs 74 to 77 among the first LEDs 21 to 24.

It can be seen, in the diffusion plate 3, that light of color B is emitted in a portion that corresponds to the second LEDs 75 to 77, which are disposed at positions not overlapped with the emitting first LEDs 21 to 24 among the second LEDs 74 to 77. Further, it can be seen, in the diffusion plate 3, that light of mixed color of color A, color B and color C is emitted at an overlapped portion of the emitting first LEDs 21 to 24, the emitting second LEDs 73 to 77 and the third LED 8. In addition, in this embodiment, because the brightness of color C is much higher than those of color A and color B, it can be seen that, substantially, light of color C is emitted at a portion in the diffusion plate 3 which corresponds to the third LED 8. From the portion in the diffusion plate 3 where the light of color C is emitted, the intensity of color B increases gradually towards the right end, and the intensity of color A increase gradually towards the left end.

Figure 5:
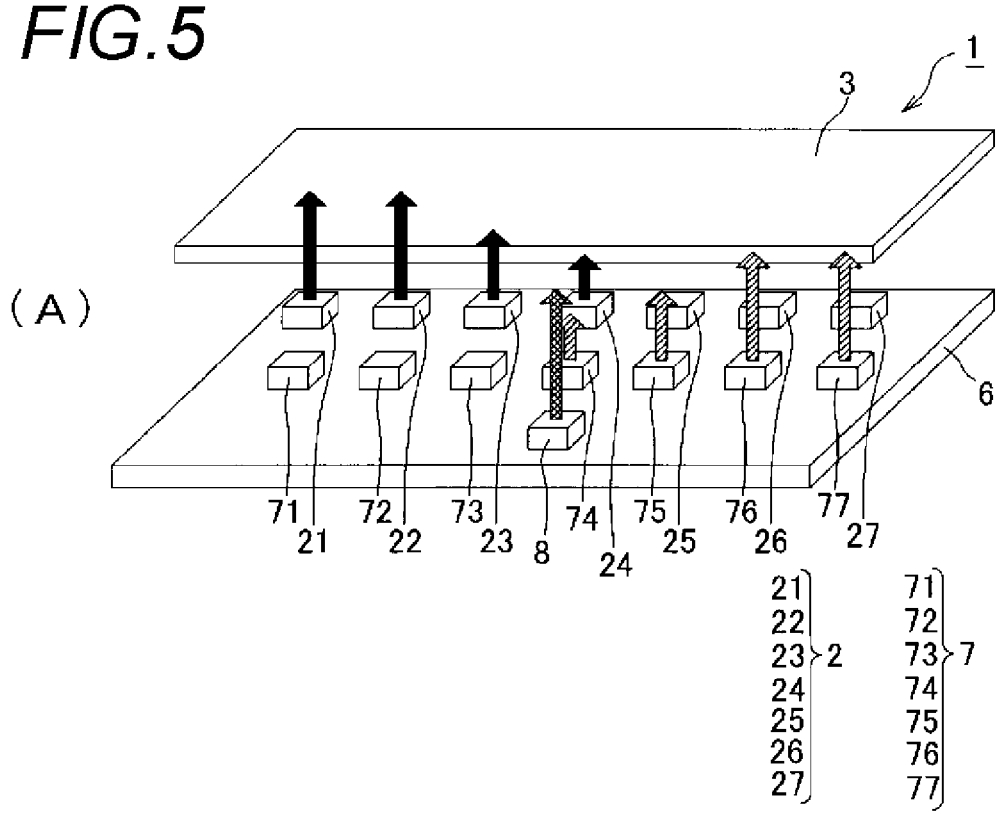
In FIG. 5, (A) is an exploded perspective view showing a display device of the invention in a third embodiment, and (B) is a front view of the display device shown in (A).
Figure 5:
Figure 6:
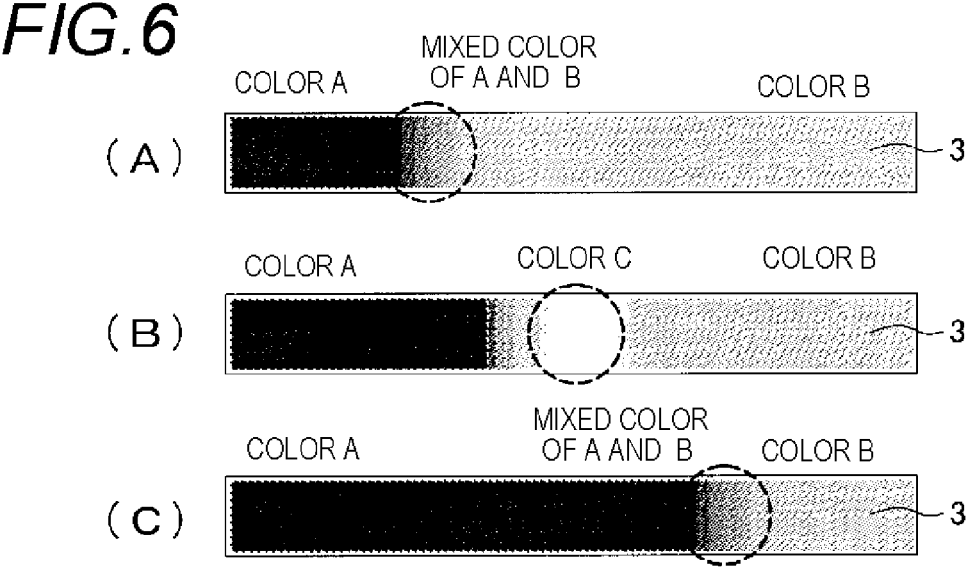
In FIG. 6, (A) to (C) show display examples of the display device shown in FIG. 5, respectively.

Therefore, as shown by (B) in FIG. 5 and (B) in FIG. 6, when the detection value of the sensor becomes a specified detection value, it can be seen that light of color C is emitted at a portion in the diffusion plate 3 which corresponds to the specified value. As a result, it can be clearly indicated that the detection value reaches the specified detection value. When the detection value of the sensor is not the specified detection value, as shown by (A) and (C) in FIG. 6, similar to the second embodiment, the detection value of the sensor is displayed by mixed color of color A and color B.

Although, in the above described third embodiment, the third LED 8 emits light when the detection value of the sensor becomes the specified value, the invention is not limited to this. For example, the light of the third LED 8 also can be controlled by the microcomputer 5 so that the brightness of the third LED 8 increases as the detection value of the sensor becomes closer to the specified detection value.

Figure 7:
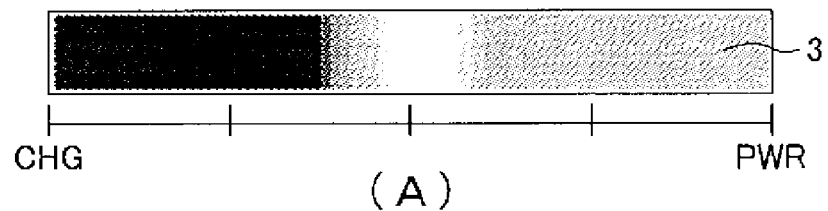
In FIG. 7, (A) is a front view of the display device shown in the third embodiment which is used as an eco-monitor, and (B) is a front view of the display device shown in the third embodiment which is used as a fuel gauge.
Figure 7:
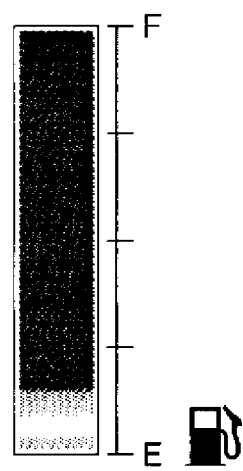

In addition, it is considered that the first, second and third embodiments are used in an eco-monitor for vehicles. In FIG. 7, (A) is a front view of the display device 1 shown in the third embodiment when used as an eco-monitor. In the eco-monitor shown by (A) in FIG. 7, being near CHG in the figure indicates that the degree that an accelerator opens is low and a battery is being charged. Being near PWR in the figure indicates that the degree that the accelerator opens is high and the vehicle is running at a poor fuel consumption rate. Being in the center of CHG and PWR indicates that the vehicle is running at a good fuel consumption rate. Thus, the microcomputer 5 causes light emission of the third LED 8 when the microcomputer detects from the degree the accelerator opens that the vehicle is running at the best fuel consumption rate, to clearly indicate the effect.

In addition, it is considered that the first, second and third embodiments are used in a fuel gauge for vehicles. In FIG. 7, (B) is a front view of the display device 1 shown in the third embodiment when used as a fuel gauge. Being near F in the figure indicates that there is a lot of remaining gasoline, and being near E in the figure indicates that there is few remaining gasoline. The microcomputer 5 causes light emission of the third LED 8 when the remaining gasoline falls below a specified value, to clearly display that there is few remaining gasoline.

Figure 8:
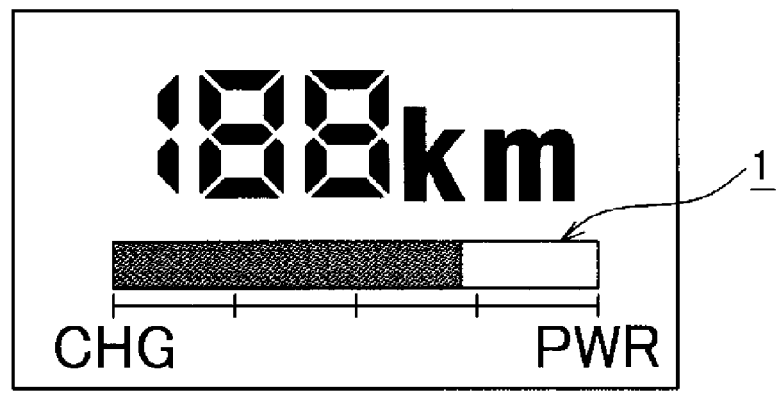
FIG. 8 is a front view of the display device according to any of the first, second and third embodiments which are used as part of a meter display.
Figure 9:
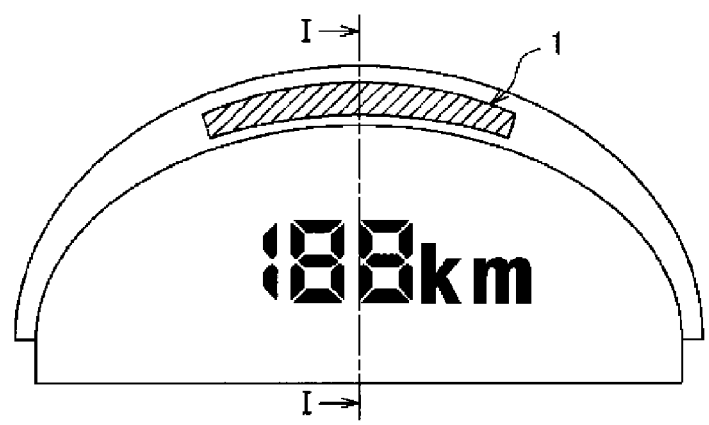
In FIG. 9, (A) is a front view of the display device shown in any of the first, second and third embodiments which are configured on an instrument panel, and (B) is a sectional view along line I-I of (A).
Figure 9:
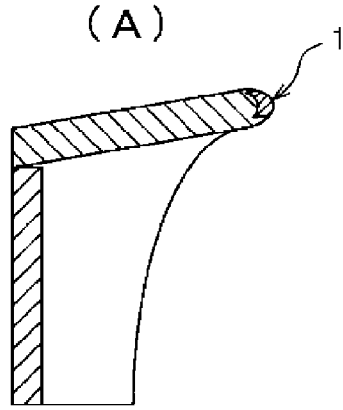
Figure 10:
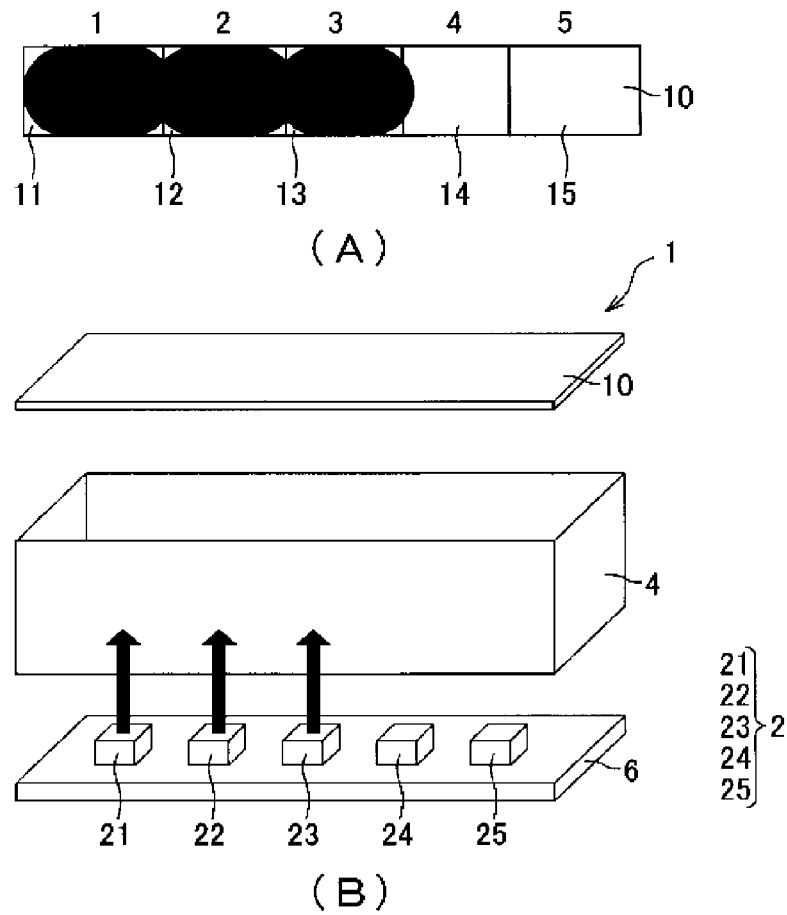
In FIG. 10, (A) is a front view of an example of a display device in a related art, and (B) is an exploded perspective view of the display device shown in (A).
Figure 11:
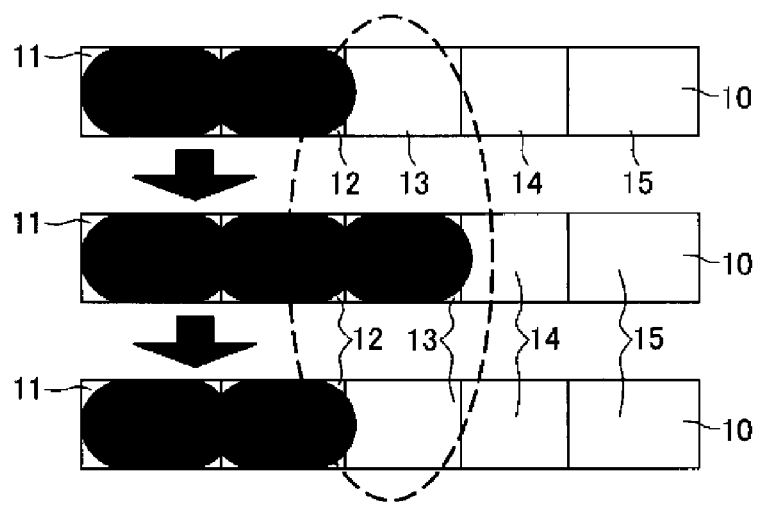
FIG. 11 is a view for explaining the problems of the display device in the related art.

In addition, as shown in FIG. 8, the first, second and third embodiments, for example, also can be used as part of a meter display. In addition, as shown in FIG. 9, by disposing the first LEDs 21 to 27, the second LEDs 71 to 77 and the third LED 8 on an FPC, it also can be considered that they can be disposed in three dimension on a curved face of an instrument panel of a vehicle.

The above described embodiments are only representative embodiments of the invention, and the invention is not limited to the above embodiments. That is, various modifications can be made without departing from the spirit and scope of the invention.

For example, although the first LEDs 21 to 27 and the second LEDs 71 to 77 are arranged in a straight line as described above, they may be arranged along a curved line or a circular ring (line). In addition, when the LEDs are arranged along a circular ring, the LED that indicates the start point of the display level to be indicated is located at one end in the arrangement direction.

Although the present invention is described in detail with reference to the embodiments, it is apparent that various modifications and amendments may be made by those skilled in the art without departing from the spirit and scope of the invention.

This application is based on Japanese patent application (No. 2009-171872) filed on Jul. 23, 2009, the contents of which are incorporated herein by reference.

REFERENCE SIGNS LIST

1: display device
2: first LED group (group of first light emitting elements)
3: diffusion plate
7: second LED group (group of second light emitting elements)
8: third LED (third light emitting element)
21 to 27: first LEDs (first light emitting elements)
71 to 77: second LEDs (second light emitting elements)

The invention claimed is:

1. A display device, comprising:
a group of first light emitting elements which includes a plurality of first light emitting elements arranged in a line from a first point to a second point in a first arrangement direction;
a light emission control unit which is configured to display a display level to be indicated by causing light emission of a first given number of the first light emitting elements, which corresponds to the display level, that starts with the first point and ends with a third point among the plurality of first light emitting elements, wherein the third point indicates the second point or a point existing between the first point and the second point in the first arrangement direction; and a group of second light emitting elements which includes a plurality of second light emitting elements arranged in parallel with the group of first light emitting elements from a fifth point to a sixth point in a second arrangement direction, which is a direction different from the first arrangement direction, and emits light of a color that is different from that of the first light emitting elements, wherein the display device further comprises a diffusion plate which is arranged at a front side of the group of first light emitting elements, the light emission control unit is configured to control light emission of a second given number of the first light emitting elements starting from a fourth point to the third point among the first given number of the first light emitting elements, with decreasing brightness towards the third point, the fourth point indicates the first point or a point existing between the first point and the third point in the first arrangement direction, and the light emission control unit is configured to cause light emission of a third given number of the second light emitting elements that starts with the sixth point and ends with a seventh point among the plurality of second light emitting elements, wherein the seventh point indicates a point arranged at a position overlapped with the fourth point in the second given number of the first light emitting elements, and also to control light emission of a fourth given number of the second light emitting elements starting from the seventh point to an eighth point among the third given number of the second light emitting elements, with decreasing brightness towards the seventh point, wherein the eighth point indicates the sixth point or a point existing between the sixth point and the seventh point in the second arrangement direction.

2. The display device according to claim 1, further comprising:

a third light emitting element which is arranged at a position corresponding to a specified display level and next to the group of first light emitting elements and the group of second light emitting elements, and emits light of a color that is different from those of the first light emitting elements and the second light emitting elements, wherein the light emission control unit is configured to cause light emission of the third light emitting element when the display level to be indicated becomes the specified display level.

3. The display device according to claim 1, further comprising:

a third light emitting element which is arranged at a position corresponding to a specified display level and next to the group of first light emitting elements and the group of second light emitting elements, and emits light of a color that is different from those of the first light emitting elements and the second light emitting elements, wherein the light emission control unit is configured to cause light emission of the third light emitting element with increasing brightness as the display level to be indicated becomes closer to the specified display level.

4. The display device according to claim 1, further comprising:

a sensor, wherein the light emission control unit controls at least the group of first light emitting elements and the group of second light emitting elements corresponding to a detection value of the sensor.

\* \* \* \* \*